United States Patent [19]
Tettamble

[11] Patent Number: 6,004,641
[45] Date of Patent: Dec. 21, 1999

[54] MOLDED PLASTISOL ARTICLE WITH TEXTURED EXTERIOR

[75] Inventor: Thomas Tettamble, St. Louis, Mo.

[73] Assignee: Sinclair & Rush, Inc., St. Louis, Mo.

[21] Appl. No.: 08/891,597

[22] Filed: Jul. 11, 1997

[51] Int. Cl.⁶ ..................................................... C08J 9/32
[52] U.S. Cl. .................. 428/36.5; 264/46.4; 428/314.2; 428/315.5; 523/218
[58] Field of Search ............................ 428/36.5, 314.2, 428/315.5; 523/218; 264/53, 46.4

[56] References Cited

U.S. PATENT DOCUMENTS

| 2,832,493 | 4/1958 | Murphy . | |
|---|---|---|---|
| 2,921,706 | 1/1960 | Johnson . | |
| 2,961,124 | 11/1960 | Hunter et al. . | |
| 2,974,373 | 3/1961 | Streed et al. | 428/36.5 |
| 3,006,780 | 10/1961 | Shaffer | 428/36.5 |
| 3,094,240 | 6/1963 | Wanderer . | |
| 3,220,902 | 11/1965 | Edwards | 264/45.5 |
| 3,225,124 | 12/1965 | Wallace | 264/45.5 |
| 3,257,025 | 6/1966 | Jolly . | |
| 3,285,455 | 11/1966 | Pewitt . | |
| 3,285,456 | 11/1966 | Pewitt . | |
| 3,455,483 | 7/1969 | Inklaar | 264/45.5 |
| 3,473,682 | 10/1969 | Studen . | |
| 3,615,972 | 10/1971 | Morehouse, Jr. et al. . | |
| 3,633,863 | 1/1972 | Abbey . | |
| 3,709,752 | 1/1973 | Wistozky et al. | 156/79 |
| 3,813,801 | 6/1974 | Vander Schaaf . | |
| 3,821,128 | 6/1974 | Garner . | |
| 4,108,806 | 8/1978 | Cohrs et al. | 521/54 |
| 4,179,546 | 12/1979 | Garner et al. . | |
| 4,225,643 | 9/1980 | Lilley | 428/207 |
| 4,293,015 | 10/1981 | McGough . | |
| 4,338,795 | 7/1982 | House, Jr. . | |
| 4,397,965 | 8/1983 | Stott . | |
| 4,513,106 | 4/1985 | Edgren et al. . | |
| 4,770,931 | 9/1988 | Pollock et al. | 428/36.5 |
| 4,800,116 | 1/1989 | Ventimiglia et al. | 428/215 |
| 4,900,489 | 2/1990 | Nagase et al. . | |
| 5,177,124 | 1/1993 | Questel et al. | 523/218 |
| 5,280,052 | 1/1994 | Questel et al. | 523/218 |
| 5,484,815 | 1/1996 | Petersen et al. . | |
| 5,658,969 | 8/1997 | Gerace | 523/218 |
| 5,766,709 | 6/1998 | Geddes et al. | 428/36.5 |

FOREIGN PATENT DOCUMENTS

| 2620803 | 3/1989 | France | 428/36.5 |
|---|---|---|---|
| 59-224317 | 12/1984 | Japan | 428/36.5 |

OTHER PUBLICATIONS

Sarvetnick, "Plastisols and Organosols",—1972—pp. 184–185.

Primary Examiner—Allan R. Kuhns
Attorney, Agent, or Firm—Polster, Lieder, Woodruff & Lucchesi

[57] ABSTRACT

A plastisol article is having an outer surface which has the look and feel of suede is provided. The article is made from a plastisol composition which includes expandable microspheres. A mold is dipped into the plastisol composition, withdrawn from the composition, and heated. The coated mold is heated at a temperature sufficient to expand the microspheres throughout the extent of the plastisol layer and to rupture the microspheres at the surface of the plastisol layer. The time and temperature at which the plastisol layer is heated causes only the microspheres substantially at the outer surface of plastisol layer to rupture. Substantially all of the microspheres within the plastisol remain unruptured. The expandable plastisol may be applied directly to a product or it may be applied over a layer of solid (unexpandable) plastisol. The expandable plastisol composition may include a blowing agent.

32 Claims, 5 Drawing Sheets

MOLDED PLASTISOL ARTICLE WITH TEXTURED EXTERIOR

CROSS-REFERENCE TO RELATED APPLICATIONS

Not applicable

STATEMENT REGARDING FEDERALLY SPONSORED RESEARCH OR DEVELOPMENT

Not Applicable.

BACKGROUND OF THE INVENTION

This invention relates to the field of hot dip molding of plastisol articles, and specifically to a process for producing a plastisol article having an outer surface which has the look and feel of suede.

Dip molded plastisol articles have been used as grips for bicycle handles, tools, etc. They have also been used as insulators for beverage cans, cups, and insulated beverage containers such as Thermos® beverage containers available from The Thermos Company. In U.S. Pat. No. 4,800,116, which is incorporated herein by reference, a process is disclosed for producing a double dip molded product or article having a solid plastisol first or inner layer and a second or outer layer of a chemically blown plastisol. The two layers are bonded and fused to each other by the process disclosed in the patent. Articles or products made in accordance with the double dip process of U.S. Pat. No. 4,800,116, have an outer surface that is free of craters or blisters. Articles and products made in accordance with that double-dip process work well as insulators and are comfortable to hold, whether the article or product is an insulator or a grip. However, I have found that the aesthetic appearance and the degree of comfort provided by the product or article can be improved by creating an outer surface which has the look and feel of suede. Suede appearing articles are often aesthetically more pleasing than are plastic or foam appearing products. Furthermore, products which imitate a suede feel are easier to grip, in that they will be less likely to slip in a wet hand.

BRIEF SUMMARY OF THE INVENTION

One of the principal objects of the present invention is to provide a dip molded plastisol article which has outer surface which has the look and feel of suede.

Another object is to provide a process for producing such an article.

A further object is to provide a plastisol composition used to produce the suede-like surface.

Briefly, a plastisol article has an outer surface which has the look and feel of suede. The article is made from a plastisol composition which includes expandable microspheres. A mold is dipped into the plastisol composition, withdrawn from the composition, and heated. The coated mold is heated at a temperature sufficient to expand the microspheres throughout the extent of the plastisol layer and to rupture the microspheres at the surface of the plastisol layer. The time and temperature at which the plastisol layer is heated causes only the microspheres substantially at the outer surface of plastisol layer to rupture. Substantially all of the microspheres within the plastisol remain unruptured. The expandable plastisol can be applied directly to a product or it can be applied over a layer of solid (unexpandable) plastisol. If the article includes both the liner and the expandable plastisol layers, the liner preferably extends above a top edge of the expandable plastisol layer to be exposed. The expandable plastisol composition can include a blowing agent.

The expandable plastisol composition comprises essentially about 29–50% by weight PVC resin, about 27–52% by weight plastisizer, about 0.1–2.5% stabilizer, and about 1–7% expandable microspheres. The composition also includes by weight about 5–15% filler and about 0.05–1.05% thickener. A colorant can be added to the composition if desired. The expandable microspheres comprise a copolymer encapsulating a blowing agent and, upon heating, they expand in diameter up to four fold.

The filler is chosen from the group consisting essentially of calcium carbonate, magnesium carbonate, silica, and combinations thereof. The thickener is a fumed silica thickener.

The PVC resin includes combinations of a dispersion resin, a foam dispersion resin, and a blending resin. The resin can be only the foam dispersion resin. Alternatively, the resin can include just the dispersion resin and the foam dispersion resin. The resin can also include all three resins.

The plasticizer is chosen from branched phthalate plasticizers, aromatic process oil plasticizers, epoxy plasticizers, and combinations thereof. The branched phthalate plasticizer is chosen from the group consisting essentially of diisoheptyl phthalate, dihexyl phthalate, butyloctyl phthalate, butylbenzyl phthalate, diisononyl phthalate, dioctyl phthalate, diisooctyl phthalate, dicapryl phthalate, isooctyltere phthalate, diisodecyl phthalate, a blend of butylbenzyl phthalate and a linear phthalate, and combinations thereof. The process oil plasticizer is an aliphatic process oil. The epoxy plasticizers are chosen from the group consisting essentially of epoxidized tallate oil, epoxidized soybean oil, epoxidized linseed oil, and combinations thereof. An acrylic monomer plasticizer can also be used.

The stabilizer is a preferably a barium zinc.

Depending on which molding process is used (i.e., is the expandable plastisol to be used with the liner plastisol, by itself, or is the blowing agent intended to be incorporated in the composition) the expandable plastisol preferably has slightly different properties. The compositions for the three compositions are thus slightly different.

The expandable plastisol composition which is used in association with the liner plastisol comprises by weight about 30–48% PVC resin; about 30–49% plasticizers; about 1–5% stabilizer; about 5–10% of filler; about 3–6% expandable microspheres; about 0.5–0.75% thickener; and about 0–5% of colorant. Preferably, the composition comprises by weight about 36–38% PVC resin; about 40–41% plasticizers; and about 1–2% stabilizer.

The PVC resin comprises a combination of a dispersion resin, a foam dispersion resin, and a blending resin. The composition comprises by weight about 18–27% dispersion resin, about 5–10% foam dispersion resin, and about 5–12% blending resin.

The plasticizer comprises a combination of phthalate plasticizers, an epoxy plasticizer, and an aromatic plasticizer. The composition comprises by weight about 27–42% phthalate plasticizer, about 0.8–3.0% epoxy plasticizer, and about 3.5–8.0% aromatic plasticizer. The epoxy plasticizer is an epoxy tallate. The aromatic plasticizer is an aliphatic process oil.

The expandable plastisol composition that is intended to be used by itself (i.e., without the liner plastisol layer) comprises about 29–50% PVC resin; about 34–52% plasticizer; about 0.5–2% stabilizer; about 6.5–13% of filler; about 1–3.4% expandable microspheres; about 0.5–1% thickener; and about 0–4% of said colorant. The PVC resin is a combination of a dispersion resin and a foam dispersion resin; the dispersion resin comprising about 23–40% by weight of the composition and the foam dispersion resin comprising about 5.5–10% of the composition. The plasticizer includes a combination of phthalate plasticizer, an epoxy plasticizer, an aromatic process oil plasticizer, and an acrylic monomer; the composition comprising by weight about 27–40% phthalate plasticizer, about 0.9–3.0% epoxy plasticizer, about 2.5–5.0% aromatic process oil plasticizer, and about 2.5–5.0% acrylic monomer. Because the plastisol is intended to be used without a liner, the composition includes a cross-linking agent to cross-link the acrylic monomer to add further structural rigidity to the article molded from the plastisol composition. The cross-linking agent is di-tert butyl phenyl peroxide.

The expandable plastisol composition which includes the blowing agent comprises about 32–40% PVC resin, about 27–48% plasticizer, about 0.3–2.2% stabilizer, about 4–6% expandable microspheres, and about 0.5–1.4% blowing agent. The composition also includes about 5–9% filler, about 0.3–2.2% additives, and about 0–4.5% colorant. The additives include wetting agents and cell stabilizing agents. The PVC resin is a foam dispersion resin. The plasticizer comprises a combination of phthalate plasticizers and aromatic process oils; the composition comprising by weight about 25–42% phthalate plasticizer and about 2–6% aromatic process oil.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
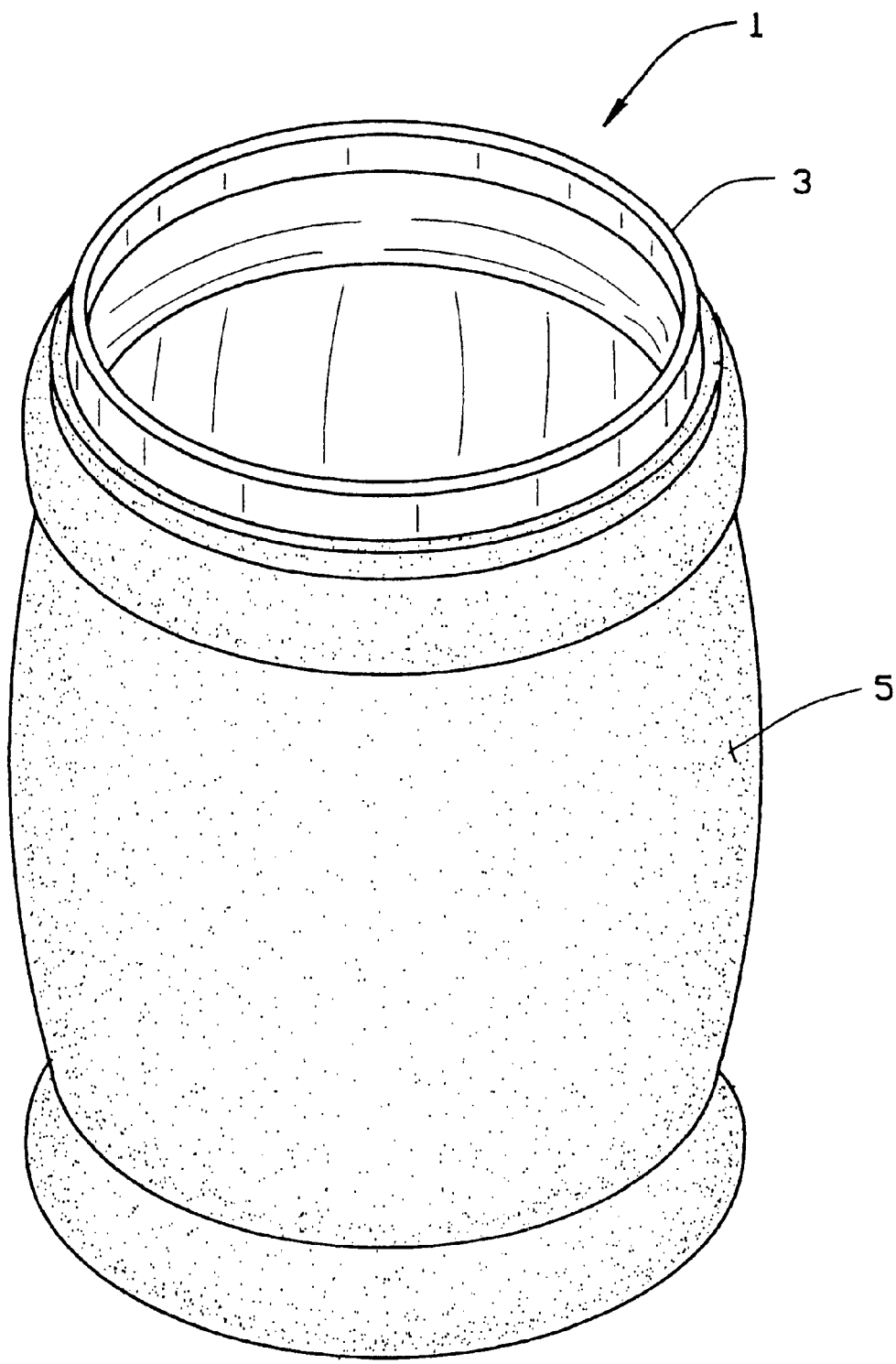
FIG. 1 is a is a perspective view of an insulating holder for beverage cans or the like formed according to the present invention, the holder having an first or inner layer of solid plastisol and a second expandable plastisol layer, the outer surface of which has the look and feel of suede.
Figure 3:
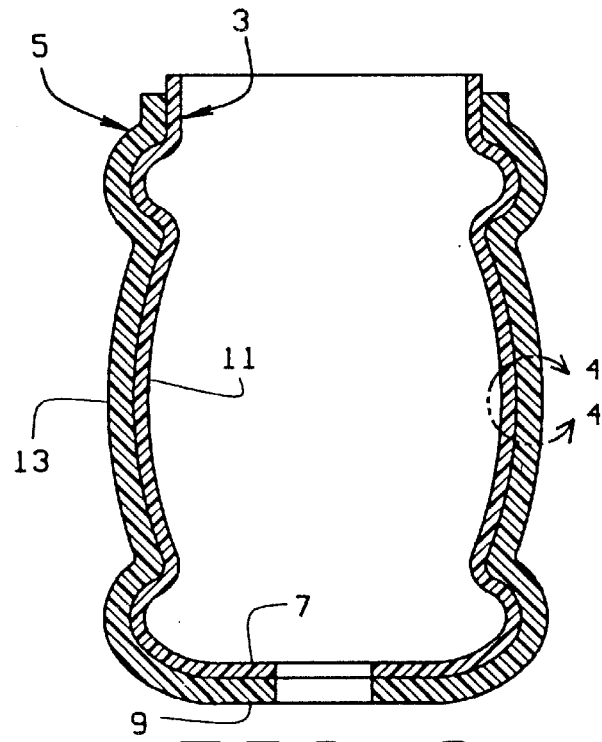
FIG. 3 is a cross-sectional view of the insulating beverage holder having the second layer formed on the first layer.

A completed article 1 of the present invention is shown in FIG. 1 as an insulating holder for a beverage can or the like. The article 1 includes a first inner layer or liner 3 and an outer second layer 5. The first layer 3 is formed from a solid liner plastisol composition and the second layer 5 is formed from a plastisol resin having expandable microspheres suspended therein. The article is molded, as shown in FIG. 3 such that each layer has an end wall 7 and 9 and a circumferentially continuous side wall 11 and 13. As shown, the second layer 5 preferably does not fully cover the first layer 3, so that a portion of the first layer 3 remains exposed and visible at a top of the article.

Figure 2:
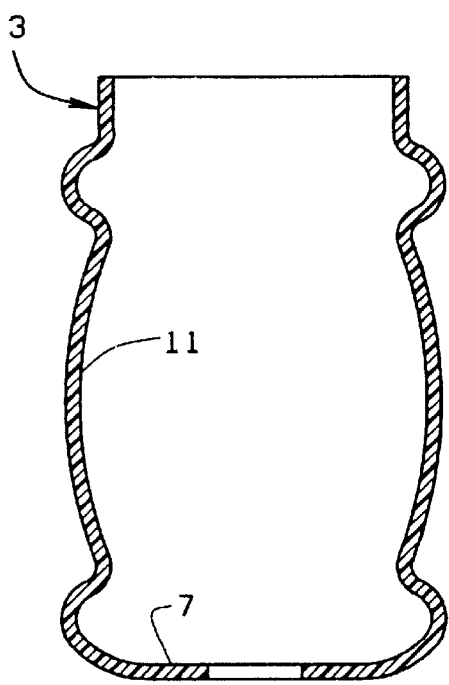
FIG. 2 is a cross-sectional view of the first layer of the insulating beverage holder.
Figure 6:
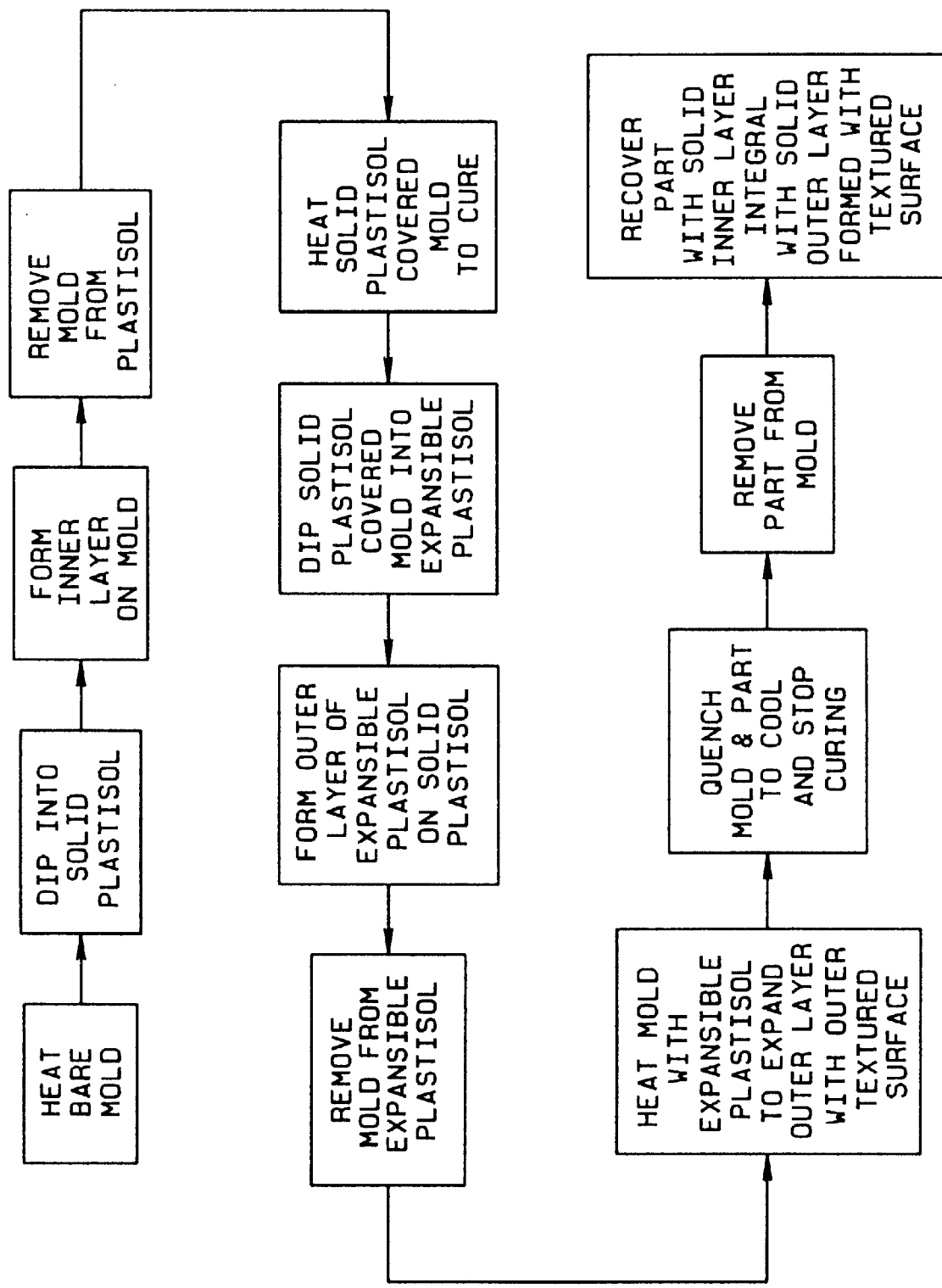
FIG. 6 is a schematic flow diagram of the process embodied in the present invention.

Referring to FIG. 6., the article 1 is formed by dipping a heated mold into a vat of a liner plastisol composition which forms the solid plastisol inner layer 3 of the article 1. Preferably, the mold is heated to a temperature of about 340–380° F. The heated mold is allowed to remain in the liner plastisol composition for about 10–40 seconds and preferably about 20–30 seconds. This time is sufficient to allow the plastisol to partially gel on the mold to a thickness of about 0.010"–0.080" (and preferably about 0.030"–0.060"). If a thinner or thicker liner is desired, the dipping time can be changed accordingly. The longer the mold remains in the liner plastisol composition, the thicker the inner layer will be when cured. The mold then is slowly and carefully withdrawn from the plastisol composition so as to minimize dripping and running of the plastisol to reduce the possibility of forming an imperfect outer surface which would not fuse at a uniform rate. The plastisol covered mold then is partially cured at a temperature of about 350–450° F. (and preferably about 400–430° F.) for about 45–75 seconds. The molded first layer is shown in FIG. 2.

Figure 4:
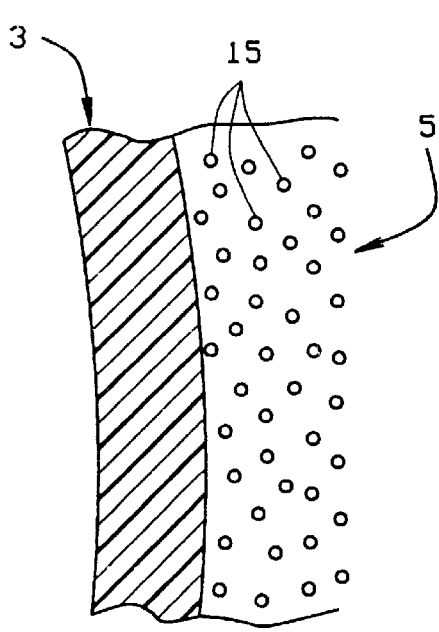
FIG. 4 is a greatly enlarged view taken along line 4—4 of FIG. 3 after the first and second layers have been formed, but before the second layer has been expanded.

The hot plastisol covered mold then is inserted into a second vat containing an expandable plastisol composition. The mold is retained in the second vat for about 5–55 seconds (preferably for about 20–40 seconds) until a layer of plastisol of about 0.005"–0.070" (and preferably about 0.025–0.050") in thickness is coated thereon. Importantly, this expandable plastisol composition contains expandable microspheres 15 (FIG. 4) which are held in a plastisol matrix. The microspheres are preferably microspheres sold under the name EXPANCEL® by Kemanord AB of Stockholm, Sweden. Such microspheres comprise a copolymer shell which encapsulates a blowing agent, such as liquid isobutane. Upon heating, the expandable microspheres expand to several times their original size. The expanded cells have a narrow particle size distribution which provides for a controlled and uniform cell structure in the second layer 5. The microspheres have a particle size of about 6–17$\mu$ as provided. Chemical blowing agents give comparatively larger cells in a wide size distribution. Thus, an uneven cell structure results when chemical blowing agents are used to expand a plastisol composition. By using the microspheres which have a controlled size distribution, a more controlled expansion of the layer can be attained at lower temperatures. This translates into lower energy usage during the process, and hence a cost savings. The article 1 is shown in FIGS. 3 and 4 after being withdrawn from the second vat, but prior to further treatment of the article.

Figure 5:
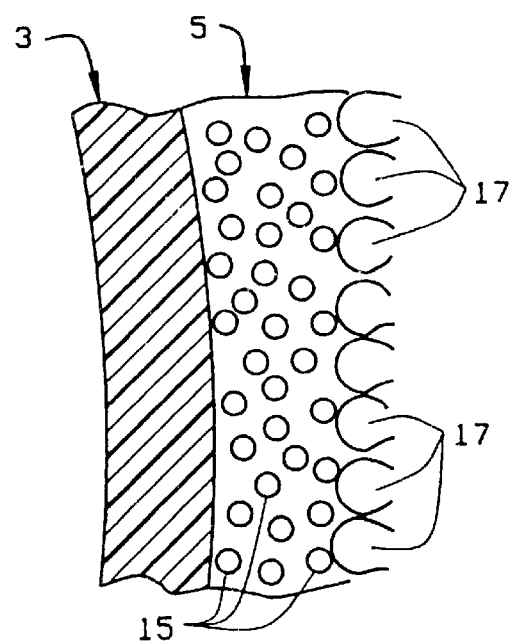
FIG. 5 is a view similar to the view of FIG. 4, but after heat treatment to expand the outer layer of the article and to rupture cells at the surface of the second layer to produce the suede look and feel of the article.
Figure 9:
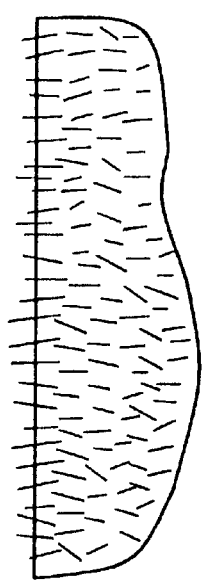
FIG. 9 is an enlarged view taken along line 9—9 of FIG. 7 showing the suede-like surface of the container.

The mold then is withdrawn from the second vat and post-baked at a temperature of about 375–455° F. (and preferably about 400–430° F.) for a time of about 40–80 seconds. This causes the microspheres 15 to expand throughout the extent of the second layer and the second layer expands to a thickness of about 0.095"–0.230". It also causes microspheres 17 at the surface of the second layer to burst or rupture, as shown in FIG. 5. As shown in FIG. 9, the ruptured microspheres form small "hairs" which give the article a suede-like look and feel. The temperature at which the mold is post baked is sufficient to cause the microspheres to expand throughout the extent of the second layer and to rupture the microspheres at the outer layer. However, the baking time is sufficiently short such that only the microspheres substantially at the outer surface of the second layer rupture. Thus, the microspheres throughout the extent of the second layer (i.e., the microspheres beneath the layer of ruptured microspheres) remain substantially unruptured or intact. Therefore, the second layer 5 forms a cushiony layer which has good insulating properties. The heating also causes the second layer 5 to fuse or unite physically with the solid plastisol layer 3 to form an integral unit or article. This bonding occurs because the liner plastisol is only partially gelled when it is immersed in the expandable plastisol composition. It thus merges with the expandable plastisol composition such that the two layers fuse and form a unitary part. The rupturing of the outer layer of the microspheres forms a velvety, non-glossy surface which is pleasant to the touch and sight. The outer surface of the second layer 5 is generally suede-like in its look and feel.

The final step is to cool the molded article in air or water and then strip the finished part from the mold for storage or packing.

Although the liner plastisol and expandable plastisol compositions both substantially comprise resins, plasticizers, and stabilizers, the two compositions have different properties and thus have different constituents or components. The composition for the liner plastisol comprises about 39.34–59.34% resin, about 20.25–54.25% plasticizer, about 0.48–3.47% stabilizer, about 0.00–0.99% moisture scavenger, about 7.61–13.61% filler, and about 0.00–0.85% thickener. Colorant can be added if desired. The thickener is provided to prevent the components of the composition (such as the filler, moisture scavenger, resin, and stabilizer) from settling out.

The resin is preferably a dispersion resin and is made up of equal parts of a high molecular weight homopolymer PVC resin and a low molecular weight homopolymer PVC resin. Thus, the composition comprises about 19.65–29.67% by weight high molecular weight resin and about 19.65–29.67% by weight low molecular weight resin A high molecular weight resin, such as CP-1755 available from Colorite Plastics of Ridgefield, N.J., and a low molecular weight PVC resin, such as V-121 available from Polycid of Mexico, have been found to work well in combination to produce a solid plastisol of desired properties. The two resins are preferably combined in a ratio of about 1:1.

The plasticizer is preferably a combination of branched phthalate plasticizers and secondary plasticizers. The phthalate plasticizer comprises about 9.51–40.72% of the plastisol composition. Preferably the phthalate plasticizer comprises a combination of diisoheptyl phthalate (DIHP) and diisononyl phthalate (DINP). The DIHP comprises about 9.27–25.27% of the plastisol composition; and the DINP comprises about 5.36–15.36% of the plastisol composition. The DIHP may be a diisoheptyl phthalate available from Exxon Chemical of Houston, Tex., under the name JayFlex-77. Other phthalate plasticizers that can be used include dihexyl phthalate, butyloctyl phthalate, butylbenzyl phthalate, dioctyl phthalate, diisooctyl phthalate, dicapryl phthalate, dioctyltere phthalate, and diisodecyl phthalate. The phthalate plasticizer may be mixed with a linear phthalate. Such a plasticizer blend is available under the name Santitizer 315 from Monsanto Chemical of St. Louis, Mo.

The secondary plasticizer comprises about 5.62–13.62% by weight of the inner layer plastisol composition. The secondary plasticizer preferably is a combination of an aromatic process oil and an aliphatic process oil. The aliphatic process oil makes up about 1.47–3.47% by weight of the inner liner plastisol composition. The aliphatic process oil is preferably a naphthinic hydrocarbon, such as is available from Exxon Chemical under the name JayFlex-215 or JayFlex-210. ViPlex 100, available from Neville Chemical Co. of Pittsburgh, Pa. is also an acceptable aliphatic hydrocarbon. The aromatic process oil makes up about 4.15–10.15% by weight of the plastisol composition. The aromatic process oil, such as is available from B.P. Oil of Cleveland, Ohio under the name EFN-101.

The stabilizer is preferably a combination of an epoxy stabilizer (such as is available from Dow Chemical under the name DER 331) and a barium zinc stabilizer (such as is available from OMG Americas Co. of Cleveland, Ohio under the name PLASTISTAB 2312). The epoxy stabilizer preferably makes up about 0.00–0.99% by weight of the plastisol composition. PLASTISTAB 2312 preferably makes up about 0.48–2.48% by weight of the plastisol composition.

The moisture scavenger is preferably calcium oxide, such as is available from Sinclair & Rush, of St. Louis, Mo. under the product code D-104-A. Other moisture scavengers can be used.

The filler is preferably a calcium carbonate, such as is available from OMYA, Inc. of Proctor, Vt. under the name SNOW-WHITE 12. The filler is chosen in part for the qualities it will give the resulting plastisol upon curing. Other fillers can be used to achieve certain desired attributes of the plastisol Lastly, the thickener is preferably a silica such as is available from Cabot Corp. of Tuscola, Ill. under the name CABOSIL. Other thickeners can be used.

For purposes of clarity, the composition is set forth in TABLE I below.

TABLE I

| INNER LINER PLASTISOL COMPOSITION | |
|---|---|
| Component | % by weight |
| Low molecular weight PVC resin | 19.67–29.67 |
| High molecular weight PVC resin | 19.67–29.67 |
| phthalate plasticizer | 14.63–43.63 |
| process oil plasticizer | 5.62–13.62 |
| Stabilizer | 0.48–3.47 |
| moisture scavenger | 0.00–0.99 |
| filler | 7.61–13.61 |
| thickener | 0.00–0.85 |

The actual percentages of the components used will vary on the characteristics of the exact component used and the desired attributes for the resulting plastisol. Thus, the percentages of the various components can be changed, as is known to those skilled in the art, to arrive at a plastisol of desired attributes.

The expandable plastisol mixture includes about 30–48% (preferably about 36–38%) by weight PVC resin, about 30–49% (preferably 40–41%) plasticizer, about 1–5% (preferably 1–2%) stabilizer, about 5–10% filler, about 3–6% expandable microspheres, and about 0.3–0.75% thickening agent. If desired, colorant can be added in an amount of about 3–8%. These percentages are all percentages by weight.

The PVC resin preferably is a combination of a dispersion resin, a foam resin, and a blending resin. The plastisol composition comprises about 18.73–26.73% dispersion resin, about 5.58–9.58% foam dispersion resin, and about 5.34–11.34% blending resin. The dispersion resin is preferably a high molecular weight dispersion resin such as is available from Oxychem of Dallas, Tex. under the name OXY 654. The foam dispersion resin is a low molecular weight resin such as is available from Formosa Plastics Corp. of Gardena, Calif. under the name FORMALON 34. The blending resin is chosen to obtain certain properties in the resulting overall composition, such as low viscosity, air release, minimization of surface gloss, and in some instances, reduction of compound costs. A preferred blending resin for the double dip process is a blending resin, such as is available from Polycid under the name Polycid V-100X122. Other blending resins that can also work well include resins available under the names VC-211 from Borden, Geon 213 from Geon, and Oxy 530 and Oxy 531 from Oxychem.

The plasticizer preferably is a combination of branched phthalate plasticizers (such as the branched phthalate plasticizers noted above in the solid plastisol composition), epoxy tallate plasticizer, and an aromatic plasticizer. The plastisol composition comprises about 27.11–41.11% branched phthalate plasticizers, about 0.89–2.89% epoxy tallate plasticizer, and about 3.68–7.68% of an aromatic plasticizer, the percentages being weight percentages of the plastisol composition. The branched phthalate plasticizer preferably is a combination of DIHP and DINP. The DIHP makes up of about 9.13–15.13% of the expandable plastisol composition, and DINP which makes up about 17.98–25.98% of the expandable plastisol composition. Preferably, the DIHP and DINP are combined in a ratio of about 1:1.8 DIHP:DINP. The epoxy tallate plasticizer is one such as is available from OMG Co. under the name PLASTISTAB 2918 and comprises about 0.89–2.89% of the composition. The aromatic plasticizer comprises about 3.68–7.68% of the composition and is preferably an aromatic plasticizer, such as an aliphatic process oil available from B.P Chemicals, Inc., Specialty Division of Cleveland, Ohio under the name ENERFLEX 101. The preferred ratios of the three plasticizers are about 3:18:1 aromatic plasticizer:phthalate plasticizer:epoxy tallate plasticizer.

The stabilizer is preferably a barium zinc stabilizer available under the name THERMCHEK 6160 available from Ferro Corp., Bedford Chemical Division of Walton Hills, Ohio.

The filler is preferably a calcium carbonate available under the name SNOWWHITE #12 from OMYA Corp.

The thickening agent is a silica, available under the name CABOSIL from Cabot Corp.

Lastly, the expandable microspheres are preferably EXPANCEL DU-120 microspheres available from Kemanord, as noted above. The EXPANCEL microspheres are of a generally uniform size (about 6–17$\mu$ in diameter), and in the form used, are dry as provided.

The composition for the expandable plastisol solution is shown below in Table II.

TABLE II

EXPANDABLE PLASTISOL COMPOSITION FOR DOUBLE DIP PROCEDURE

| COMPONENT | Weight % |
|---|---|
| Dispersion resin | 18.73–26.73 |
| Foam Dispersion Resin | 5.58–9.58 |
| Blending resin | 5.34–11.34 |
| Aromatic plasticizer | 3.68–7.68 |
| Phthalate plasticizer | 27.11–41.11 |
| Epoxy tallate plasticizer | 0.89–2.89 |
| Barium zinc stabilizer | 0.14–2.14 |
| Calcium carbonate | 5.58–9.58 |
| Expandable microspheres | 3.74–5.74 |
| silica thickener | 0.33–0.73 |
| Coloring agent, if desired | 3.68–7.68 |

Figure 7:
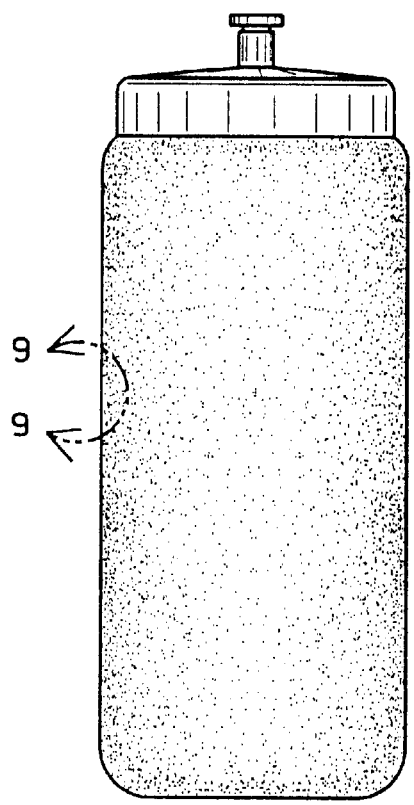
FIG. 7 is a side elevational view of an insulated beverage container having a coating formed by the process of the present invention.
Figure 8:
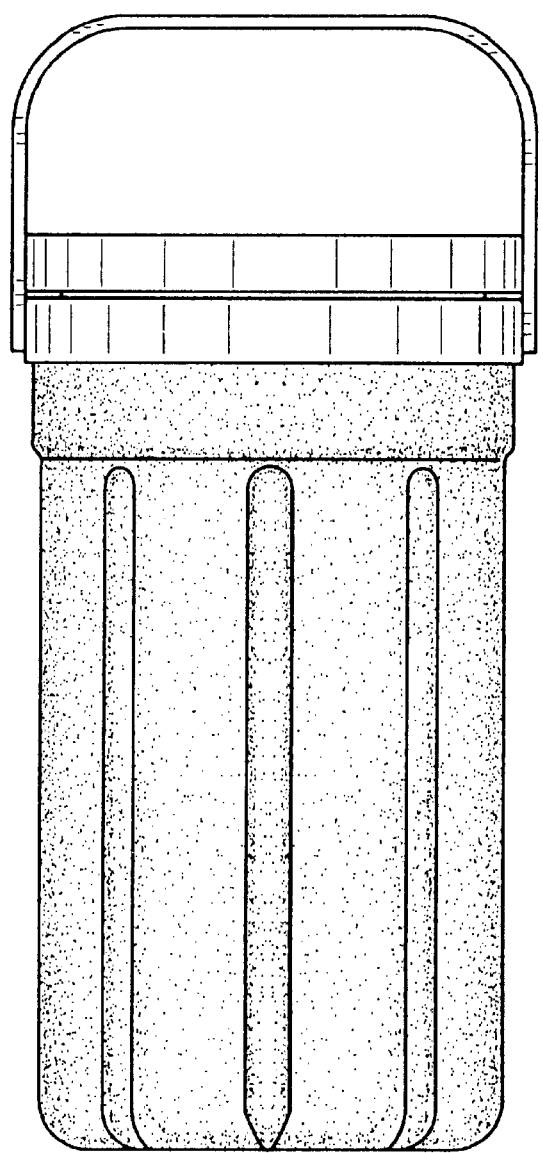
FIG. 8 is a side elevational view of a thermos having an insulating coating formed by the process of the present invention.
Figures 10, 11, 12:
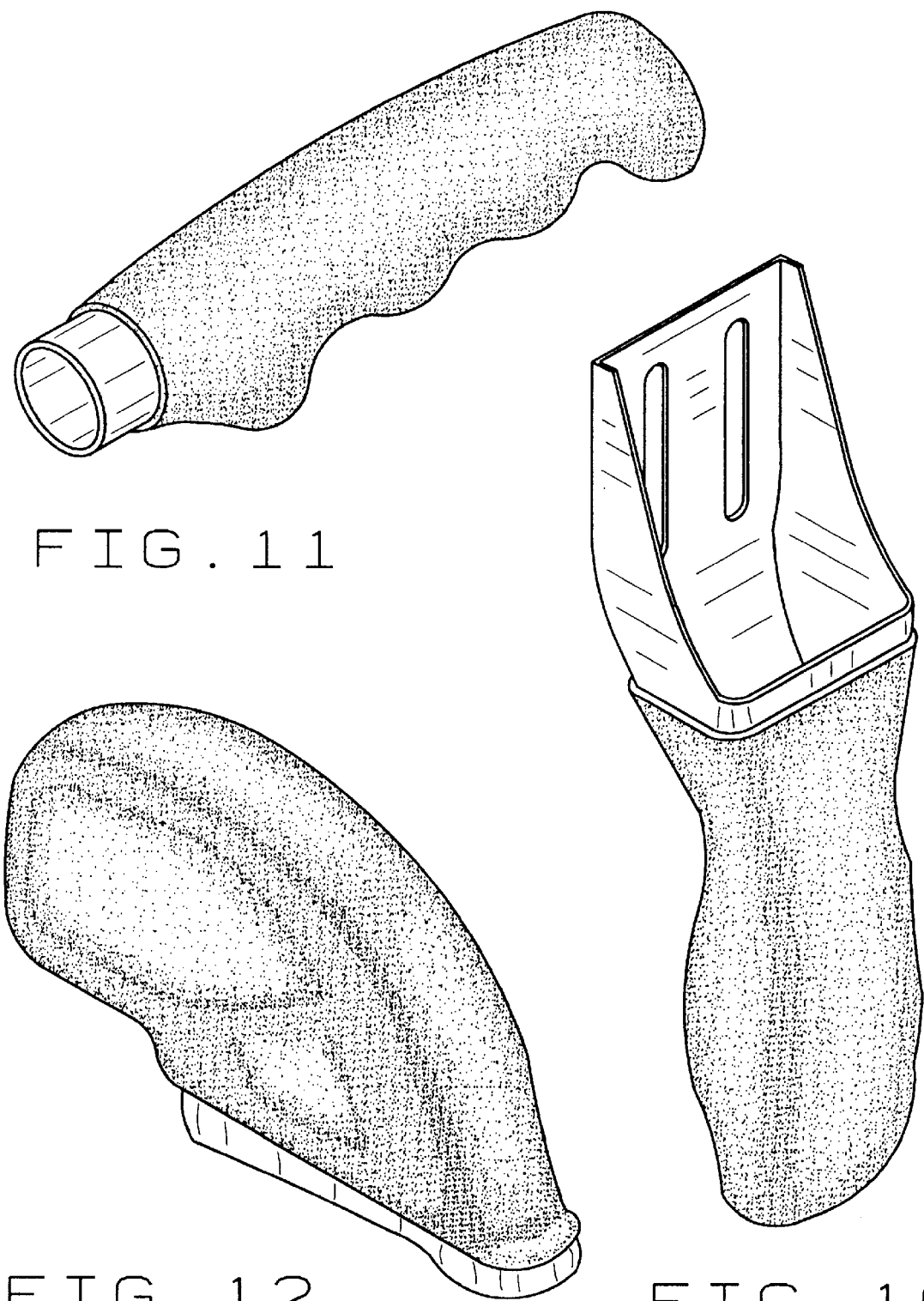
FIG. 10 is a perspective view showing a tool holster having a coating or covering formed by the process of the present invention.
FIG. 11 is a perspective view of a handle or grip having a coating or covering formed by the process of the present invention.
FIG. 12 is a perspective view of a golf club cover formed by the process of the present invention.

The above procedure involves dipping the mold first into the liner plastisol composition and then into the expandable plastisol composition. For that reason, it is referred to as a double dip process. The expandable plastisol composition, when expanded and set, does not have much structural stability of its own. In the article 1 (FIG. 1), which is made according to the double dip process, noted above, structural stability for the second layer 5 is provided by the first layer 3 which is the solid plastisol. The articles shown in FIGS. 7, 8 and 10–12 show other products in which the article made in accordance with the double dip process can find use. FIG. 7 shows a sport drink bottle; FIG. 8 shows a thermos; FIG. 10 shows a tool holster; FIG. 11 shows a grip for a bicycle or the like; and FIG. 12 shows a golf club cover.

For other products, however, the first, solid plastisol, layer may not be needed. For such products, the product itself is the mold for the expandable plastisol and the product provides the necessary structural rigidity for the expandable plastisol coating. Thus, there is no need to dip the mold (which in these instances is the product to be coated with the expandable plastisol) into the solid plastisol composition. These coated products are formed by a single dip procedure. In this procedure, the mold (i.e., the product to be coated) is dipped into an expandable plastisol composition containing expandable microspheres. The mold remains in the composition for about 15–60 seconds (preferably 30–45 seconds) at which point it is slowly withdrawn from the expandable plastisol composition. Slow withdrawal of the mold from the vat of plastisol will provide an even layer of uncured expandable plastisol composition on the mold. The mold with the expandable plastisol composition is then slowly baked at about 360–390° F. for a period (about 3–5 minutes) sufficient to cause the microspheres in the plastisol to expand and to cause the microspheres substantially at the outer surface of the plastisol layer to rupture. As with the article 1, the coating made according to this process produces a textured outer surface which is suede-like in its appearance and its feel. As can be appreciated, this is similar to the second dip step above. Although the expandable plastisol composition noted above in TABLE II can be used in a single dip procedure, the single dip procedure preferably uses a slightly different expandable plastisol composition.

The expandable plastisol composition for the single dip process comprises about 29.17–49.19% (and preferably about 38–40%) resin, about 34.05–51.99% (and preferably about 41–43%) plasticizer, about 0.67–2.00% (and preferably about 1–2%) stabilizer, about 6.79–12.79% (and preferably about 7–9%) filler, about 1.0–3.35% (and preferably about 1–2%) expandable microspheres, about 0.05–1.05% (and preferably about 0.5–1.0%) thickener. If desired, about 1–4% colorant can be added to the composition to provide a desired color.

As before, the resin is combination of a high molecular weight dispersion resin and a foam dispersion resin. The foam dispersion resin sets or gels faster than the high molecular weight dispersion resin and provides some hot melt strength to the plastisol as the plastisol composition begins to partially set when the mold is dipped into the vat containing the composition. The hot melt strength provided by the foam dispersion resin gives some structure in which the microspheres can expand. The high molecular weight dispersion resin and the foam dispersion resin are the same as used in the expandable plastisol composition for the double dip process, noted above. The dispersion resin comprises about 23.31–39.31% of the plastisol composition; and the foam dispersion resin comprises about 5.83–9.83% of the plastisol composition. The preferred ratios of the resins to each other are 4.7:1 to about 4:1 (dispersion resin:foam dispersion resin).

The plasticizers again are a combination of branched phthalate plasticizer, an epoxy tallate plasticizer, an aromatic process oil plasticizer, and an acrylic monomer. The branched phthalate plasticizer makes up about 27.27–39.27% of the composition and preferably comprises a combination DINP and DIHP. The DINP comprises about 4.87–6.87% of the composition and the DIHP comprises about 22.4–32.4% of the composition. The DINP and DIHP are preferably combined in a ratio of from about 4.6:1 to about 4.7:1 DINP:DIHP. The epoxy tallate plasticizer comprises about 0.96–2.96% of the composition. The epoxy tallate plasticizer is preferably PLASTISTAB 2918, as noted above in the expandable plastisol composition for the double dip process. The aromatic process oil is preferably ENERFLEX 101, as above, and comprises about 2.91–4.91% of the composition. The acrylic monomer is preferably trimethylolpropane trimethacrylate, such as is available from Sartomer Co. of Exton, Pa. under the name SR-350. The acrylic monomer comprises about 2.91–4.91% of the plastisol composition and is provided to improve hardness, heat resistance and solvent resistance of the resulting plastisol.

Di-tert butyl peroxide is provided to cross-link the acrylic monomer. Cross-linking the acrylic monomer will provide some structural rigidity to the resulting molded plastisol product. The di-tert butyl peroxide comprises about 0.03–0.05% of the plastisol composition.

The stabilizer is a barium zinc stabilizer such as is available from Ferro Corp. under the name THERMCHEK.

The filler is a calcium oxide, such as SNOWWHITE 12.

The thickener is a silica thickener, such as CABOSIL.

The composition is shown in table format below in Table III.

TABLE III

SINGLE DIP EXPANDABLE PLASTISOL COMPOSITION

| COMPONENT | WEIGHT % |
|---|---|
| High molecular weight dispersion resin | 23.31–39.31 |
| Foam dispersion resin 34 | 5.83–9.83 |
| Di-tert-butyl peroxide | 0.03–0.05 |
| aromatic process oil plasticizer | 2.91–4.91 |
| phthalate plasticizer | 27.27–39.27 |
| acrylic monomer plasticizer | 2.91–4.91 |
| epoxy tallate plasticizer | 0.96–2.96 |

TABLE III-continued

SINGLE DIP EXPANDABLE PLASTISOL COMPOSITION

| COMPONENT | WEIGHT % |
|---|---|
| barium zinc stabilizer | 0–1.67 |
| calcium carbonate filler | 6.79–12.79 |
| expandable microspheres | 1.35–3.35 |
| Silica thickener | 0.05–1.05 |
| coloring agent | 0–4.91 |

In a further example, the article 1, or any of the coatings applied to the products of FIGS. 7–12 can be made with an expandable plastisol which includes both microspheres and a blowing agent. In this example, the composition of the foaming expandable plastisol composition comprises about 32–40% (and preferably 38–40%) PVC resin, 27.51–47.51% (and preferably 36–38%) branched phthalate and secondary plasticizers, 0.3–2.2% (and preferably 0.5–1%) stabilizer, 5–9% (and preferably 7–9%) filler, about 0.3–2.2% (and preferably about 1–2%) additives, about 4–6% microspheres, 0.7–1.3% (and preferably 0.5–1%) blowing agent, and, if desired, about 0–4.3% (and preferably 1–3%) colorant.

As with the previous compositions, the plasticizer is a combination of branched phthalate and aromatic plasticizers. The branched phthalate plasticizer comprise about 25.52–41.52% of the plastisol composition. The branched phthalate plasticizer preferably is a combination of DIHP and DINP, combined in a ration of about 1.6:1 DIHP:DINP. The aromatic process oil plasticizer is preferably ENERFLEX 101 and comprises about 1.99–5.99% of the composition.

The stabilizer is preferably an epoxy stabilizer, such as DER 331 available from Dow Chemical, and comprises about 0.0–0.9% of the composition.

The PVC resin is preferably a foam dispersion resin, such as FORMALON F-34, and comprises approximately 31.92–47.92% of the composition.

The blowing agent is preferably an azodicarbomide such as is sold by Uniroyal Chemical Company of Middlebury, Conn. under the name CELOGEN A2120. A zinc based activator, such as ACTIFOAM R-3, also available from Uniroyal Chemical is provided to activate the blowing agent.

The microspheres are dry as provided, as noted above, and are preferably EXPANCEL DU12D microspheres.

The filler is preferably a calcium carbonate.

The additives include items such as glycol esters which act as wetting agents or emulsifiers and cell structure enhancers. An acceptable wetting agent is polyethylene glycol ester which is available under the name POLYPEG 400 from Uniroyal Chemical Company, Inc. of Middlebury, Conn. The polyethylene glycol comprises about 0.0–0.9% of the plastisol composition. The cell structure enhancer is preferably a glycol composition such as is available from Air Products and Chemicals, Inc. of Allentown, Pa. under the name VS-103. The cell structure enhancer preferably comprises about 0.3–1.3% of the plastisol composition.

The coloring agents used depend solely on the color of the desired end product.

TABLE IV

EXPANDING PLASTISOL WITH BOTH MICROSPHERES AND FOAMING AGENT

| COMPONENT | WEIGHT % |
|---|---|
| phthalate plasticizers | 25.52–41.52 |
| aromatic plasticizer | 1.99–5.99 |
| Cell Stabilizer | 0.3–2.2 |
| Epoxy stabilizer | 0.0–0.9% |
| Foam dispersion resin | 31.92–37.92 |
| Blowing Agent | 0.7–1.3 |
| Activator | 0.3–1.3 |
| Glycol Ester additive | 0.0–0.9 |
| calcium carbonate filler | 4.98–14.98 |
| expandable microspheres | 4.99–6.99 |
| colorant | 2.2–4.2 |

An article or coating made with this composition is made substantially the same way as any of the articles shown in FIGS. 1 and 7–11, and as described above. Essentially, the mold to be coated with the expandable plastisol is dipped in a vat of the plastisol for a sufficient period of time (i.e., 30–75 seconds and preferably about 45–60 seconds) to provide a coating of a desired thickness on the mold. The coated mold is then slowly removed from the vat and then baked at 350–400° F. for a sufficient period of time (approximately 3–5 minutes) to cause the microspheres to expand an to allow the blowing agent to be activated to expand the plastisol layer. The temperature is sufficient to cause the microspheres at the surface of the coating to rupture, to give the outer surface of the coating the look and feel of suede. However, the time for which the mold is baked prevents the microspheres within the plastisol layer to rupture. Thus, only the microspheres substantially at the outer surface of the expandable plastisol coating rupture.

In addition to the indicated use as a cover for beverage cans, tool handles, bicycle handles, thermos bottle jackets, and golf club covers, the compositions (i.e., either the single dip, the double dip, or the foaming, expanding plastisol composition) can be used with many other products. This invention is intended to cover all modifications and improvements to the invention described and claimed. In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

I claim:

1. A molded composite hollow plastisol product comprising:
   a one-piece plastisol first layer of a desired thickness; and
   a one-piece plastisol second layer of a desired thickness having a closed cellular heat expanded construction and comprising expanded spheres contained in a plastisol matrix, the second layer surrounding and being bonded to the first layer and having a textured outer surface formed by the heated expansion and rupture of the expanded spheres at least along an outer surface of the second layer.

2. The molded composite hollow plastisol product of claim 1 wherein the textured outer surface has a suede look and feel.

3. The molded composite hollow plastisol product as defined in claim 1 in which the first and second plastisol layers each have an end wall connected to a circumferentially continuous side wall.

4. The molded composite hollow plastisol product as defined in claim 1 in which the second layer is expanded throughout its extent.

5. The molded composite hollow plastisol product as defined in claim 1 in which only the expanded spheres at an outer surface of the second layer are ruptured to form the textured outer surface.

6. The molded composite hollow plastisol product as defined in claim 1 in which the composition for the second layer comprises a PVC resin, a plasticizer, a stabilizer, and expandable spheres.

7. The molded composite hollow plastisol product as defined in claim 1 in which the composition of the expandable spheres comprise a copolymer encapsulating a blowing agent, the expandable spheres expanding upon heating.

8. The molded composite hollow plastisol product of claim 1 wherein the plastisol second layer comprises a PVC resin, a plasticizers, a stabilizer, and the expanded spheres.

9. The molded composite hollow plastisol product of claim 8 wherein the plastisol second layer composition further includes a colorant.

10. The molded composite hollow plastisol product as defined in claim 8 wherein the stabilizer is a barium zinc.

11. The molded composite hollow plastisol product as defined in claim 8 wherein the plastisol second layer includes a blowing agent.

12. The molded composite hollow plastisol product as defined in claim 11 wherein the plastisol second layer comprises about 0.5–1.5% blowing agent.

13. The molded composite hollow plastisol product as defined in claim 12 wherein the plastisol second layer includes a wetting agent and a cell stabilizer.

14. The molded composite hollow plastisol product as defined in claim 8 wherein the expanded spheres comprise a copolymer encapsulating a blowing agent.

15. The molded composite hollow plastisol product as defined in claim 14 wherein the wherein the plastisol second layer comprises about 29–50% by weight PVC resin, about 27–52% by weight plasticizer, about 0.1–2.5% by weight stabilizer, and about 1–7% expandable spheres.

16. The molded composite hollow plastisol product as defined in claim 15 wherein the plastisol second layer includes a filler and thickener, the plastisol second layer comprising by weight about 5–15% filler and about 0.05–1.05% thickener.

17. The molded composite hollow plastisol product as defined in claims 16 wherein the filler is selected from the group consisting of calcium carbonate, magnesium carbonate, silica, and combinations thereof, and the thickener is a fumed silica thickener.

18. The molded composite hollow plastisol product as defined in claim 15 wherein the PVC resin is a combination of a dispersion resin and a foam dispersion resin, the composition comprising by weight about 18–39% dispersion resin and about 1–10% foam dispersion resin.

19. The molded composite hollow plastisol product as defined in claim 18 wherein the resin includes a blending resin, the composition comprising by weight about 5–11% blending resin.

20. The molded composite hollow plastisol product as defined in claim 15 wherein the plasticizer comprises a branched phthalate and a process oil plasticizer.

21. The molded composite hollow plastisol product as defined in claim 20 wherein the plastisol second layer comprises by weight about 25–42% branched phthalate plasticizer and about 2–8% process oil plasticizer.

22. The molded composite hollow plastisol product as defined in claim 21 wherein said branched phthalate is selected from the group consisting of disoheptyl phthalate, dihexyl phthalate, butyloctyl phthalate, butylbenzyl phthalate, diisononyl phthalate, dioctyl phthalate, diisooctyl phthalate, dicapryl phthalate, isooctyltere phthalate, diisodecyl phthalate, a blend of butylbenzyl phthalate and a linear phthalate, and combinations thereof; and the process oil plasticizer is selected from the group consisting of an aliphatic process oil, a naphthinic hydrocarbon, and combinations thereof.

23. The molded composite hollow plastisol product as defined in claim 21 wherein the plasticizer includes an epoxy plasticizer; the composition comprising by weight about 0.9–3.0% epoxy plasticizer.

24. The molded composite hollow plastisol product as defined in claim 23 wherein the epoxy plasticizer is selected from the group consisting of epoxidized tallate oil, epoxidized soybean oil, epoxidized linseed oil , and combinations thereof.

25. The molded composite hollow plastisol product as defined in claim 23 wherein the plasticizer includes an acrylic monomer plasticizer; the composition comprising by weight about 2.5–5.0% acrylic monomer.

26. The molded composite hollow plastisol product as defined in claim 25 wherein the plastisol second layer includes a peroxide cross-linking agent to cross link the acrylic monomer plasticizer.

27. A molded composite hollow plastisol product comprising:
   a one-piece plastisol first layer of a desired thickness; and
   a one-piece plastisol second layer of a desired thickness having a closed cellular heat expandable construction, the second layer being bonded to the first layer, the second layer comprising expanded microspheres contained in a plastisol matrix; the second layer having a textured outer surface formed by the heated expansion and rupture of the closed cellular construction at an outer surface of the second layer.

28. A molded composite insulated hollow plastisol container, comprising:
   a first one-piece plastisol container having a first end wall connected to a first circumferentially continuous side wall;
   a second one-piece plastisol container having a second end wall connected to a second circumferentially continuous side wall;
   the second one-piece plastisol container surrounding the first one-piece plastisol container with the first and second end walls and first and second circumferentially continuous side walls bonded and fused to one another;
   the second one-piece plastisol container being formed from a plastisol compound containing expandable microspheres; the microspheres of the second one-piece plastisol container being expanded and ruptured along an outer surface of the second one-piece container to provide a textured outer surface for the molded composite plastisol insulated container.

29. The molded composite insulated hollow plastisol container as defined in claim 28, in which the textured outer surface has the look and feel of suede material.

30. The molded composite insulated hollow plastisol container as defined in claim 29 wherein the first one-piece plastisol container extends beyond a top of the second one-piece plastisol, such that the first one-piece plastisol container is partially visible.

31. A molded hollow plastisol product comprising:
   a one-piece plastisol element having a circumferentially continuous side wall,
   the one-piece plastisol element being formed from a plastisol material including expandable microspheres; the microspheres being heat expanded and ruptured along an outer surface of the product to provide a textured outer surface for the molded plastisol product.

32. The molded hollow plastisol product as defined in claim 31 in which the circumferentially continuous side wall is connected at one end to an end wall.

* * * * *

UNITED STATES PATENT AND TRADEMARK OFFICE
CERTIFICATE OF CORRECTION

PATENT NO : 6,004,641
DATED : December 21, 1999
INVENTOR(S) : Thomas Tettamble

It is certified that error appears in the above-identified patent and that said Letters Patent is hereby corrected as shown below:

Col. 13, line 3
 replace "disoheptyl"
 with --diisoheptyl--.

Signed and Sealed this

Twenty-third Day of January, 2001

Attest:

Q. TODD DICKINSON

*Attesting Officer*     *Commissioner of Patents and Trademarks*